United States Patent
Choo

(12) 
(10) Patent No.: US 6,621,864 B1
(45) Date of Patent: Sep. 16, 2003

(54) MOTION VECTOR BASED FRAME INSERTION PROCESS FOR INCREASING THE FRAME RATE OF MOVING IMAGES

(75) Inventor: Chang Y. Choo, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 914 days.

(21) Appl. No.: 09/167,994

(22) Filed: Oct. 7, 1998

Related U.S. Application Data

(63) Continuation of application No. 08/409,569, filed on Mar. 24, 1995, now Pat. No. 5,943,096.

(51) Int. Cl.[7] .................................................. H04N 7/18
(52) U.S. Cl. ......................... 375/240.16; 375/240.12; 375/240.27
(58) Field of Search ................................. 348/413, 411, 348/410, 416, 415, 414, 699, 700; 375/240.1–240.29

(56) References Cited

U.S. PATENT DOCUMENTS

| | | | | |
|---|---|---|---|---|
| 4,383,272 A | | 5/1983 | Netravali et al. ............ 358/136 |
| 4,651,207 A | | 3/1987 | Bergmann et al. .......... 358/136 |
| 4,703,350 A | | 10/1987 | Hinman ....................... 358/133 |
| 4,727,422 A | | 2/1988 | Hinman ....................... 348/416 |
| 4,849,810 A | | 7/1989 | Ericsson ..................... 358/133 |
| 5,113,255 A | | 5/1992 | Nagata et al. ............... 358/136 |
| 5,144,427 A | | 9/1992 | Kitaura et al. .............. 348/415 |
| 5,151,784 A | | 9/1992 | Lavagetto et al. .......... 348/416 |
| 5,155,593 A | | 10/1992 | Yonemitsu et al. ......... 358/133 |
| 5,253,054 A | | 10/1993 | Fujiwara et al. ............ 348/411 |
| 5,283,646 A | | 2/1994 | Bruder ........................ 348/415 |
| 5,353,062 A | | 10/1994 | Maeda ........................ 348/416 |
| 5,353,119 A | | 10/1994 | Dorricott et al. ........... 348/446 |
| 5,386,234 A | | 1/1995 | Veltman et al. ............. 348/409 |
| 5,398,068 A | | 3/1995 | Liu et al. .................... 348/409 |
| 5,400,076 A | | 3/1995 | Iwamura ..................... 348/409 |
| 5,412,435 A | | 5/1995 | Nakajima ................... 348/411 |
| 5,418,569 A | | 5/1995 | Ando .......................... 348/405 |
| 5,418,570 A | | 5/1995 | Ueno et al. ................. 348/413 |
| 5,453,801 A | | 9/1995 | Kim ............................ 348/416 |
| 5,467,136 A | | 11/1995 | Odaka et al. ............... 348/416 |
| 5,479,212 A | | 12/1995 | Kurobe et al. .............. 348/409 |
| 5,485,216 A | | 1/1996 | Lee ............................. 348/412 |
| 5,541,660 A | * | 7/1996 | Kim et al. .................. 348/416 |
| 5,596,369 A | * | 1/1997 | Chau .......................... 348/416 |
| 6,016,162 A | * | 1/2000 | Odaka et al. ............... 348/416 |
| 6,025,878 A | * | 2/2000 | Boyce et al. ............... 348/402 |

FOREIGN PATENT DOCUMENTS

| | | |
|---|---|---|
| EP | 397206 | 11/1990 |
| GB | 2253760 | 9/1992 |

\* cited by examiner

*Primary Examiner*—Andy Rao

(57) ABSTRACT

A video decoding and display system uses temporal post-processing to smooth motion in a displayed moving image. The temporal post-processing uses motion vectors each of which indicates visually similar areas, in first and second frames to generate interpolated motion vectors which match areas in an interpolated frame to visually similar areas in the first and second frames. In one embodiment, each component of each motion vector is divided by two and used to generate an interpolated frame half way between the first and second frames. Display of the first and second frames are delayed so that the interpolated frame is displayed at a time half way between the display times of the first and second frames.

15 Claims, 3 Drawing Sheets

MOTION VECTOR BASED FRAME INSERTION PROCESS FOR INCREASING THE FRAME RATE OF MOVING IMAGES

CROSS-REFERENCE TO RELATED APPLICATION

This patent document is a continuation of U.S. patent application Ser. No. 08/409,569 filed Mar. 24, 1995, now U.S. Pat. No. 5,943,096.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates to temporal post-processing of compressed moving images and processes for improving quality of compressed moving images having low frame rates.

2. Description of Related Art

Phone lines are commonly used for digital communications between computers or other devices using modems and standard communications protocols. Such communication protocols have bit rates limited by the quality of transmission over the phone lines. For example, the V.FAST and H.26P standards for PSTN lines have bit rates between 16.8 and 28.8 kbit/s depending on the quality of the connection. These bit rates are low when compared to the bandwidth needed for transmitting high quality digital moving images, especially if the bandwidth also carries audio and/or other information.

Conventional moving images are a series of frames (or still images which are displayed sequentially. The frames can be represented digitally by two-dimensional arrays of pixel values which indicate colors and/or intensities of pixels in the frames. Transmission of uncompressed pixel values by videophones is impractical because of the large amount of data required to transmit every pixel value in every frame of a moving picture. Accordingly, videophone systems contain encoding circuits which compress a series of two-dimensional arrays of pixel values into codes representing the moving image and decoding circuits which convert codes back into a series of two-dimensional arrays.

Frame difference coding such as DPCM (differential pulse coded modulation) is a well known compression technique that removes redundant information from a representation of a moving image. Frame difference coding subtracts pixel values of a preceding frame from pixel values of a current frame and extracts non-zero values which indicate changes between the frames. Redundant data, data repeated in successive frames, appear as zeros in the difference frame, and the large number of zeros can be efficiently coded or removed. Motion estimation techniques further reduce the number of non-zero values by subtracting from each block in a current frame, a block in a preceding frame at a position indicated by a motion vector. The motion vector is selected to reduce or minimize the difference.

Even with compression techniques, the bit rate of a communication channel limits the maximum frame rate, number of frames per second, for a moving image. For example, the H.26P standard limits video transmission to less than ten frames per second. At low frame rates, motion in displayed moving images appears jittery or discontinuous rather than smooth. Accordingly, processes for improving moving image quality at low bit rates are widely sought.

SUMMARY OF THE INVENTION

In accordance with an embodiment of the invention, a video decoding and display system uses temporal post-processing to smooth motion displayed in moving images. The temporal post-processing uses motion vectors to generate one or more interpolated frames which are inserted in the moving image. The motion vectors indicate an offset between similar areas in first and second frames. The similar areas typically contain an object that moves in the moving image. Interpolated motion vectors, which are determined from the motion vectors, indicate interpolated positions of moving objects at times between the first and second frames. One or more interpolated frames inserted between the first and second frames show the objects at the interpolated positions indicated by the interpolated motion vectors.

One embodiment of the invention, decodes and displays a moving image by: decoding first and second consecutive frames from a signal representing the moving image; generating interpolated motion vectors from motion vectors which identify blocks in the first frame which are similar to blocks in the second frame; generating one or more interpolated frames from the interpolated motion vectors; and displaying a series of frames including the first frame followed by the interpolated frames followed by the second frame. Display times of the first and second frames are delayed so that the display times of the interpolated frames are proportionally spaced between the first and second frames.

In addition to the motion vectors, information used in generating the interpolated frame includes pixel values from the first and/or second frames and/or values from difference blocks used to generate the second frame from the first frame. Typically, the motion vectors and difference blocks are decoded from a signal which represents the second frame; but alternatively, a decoder determines motion vectors from the firsthand second frames during post-processing.

Another embodiment of the invention is a process for forming a moving image which includes: determining a motion vector that indicates a relative offset between first and second areas of the moving image, wherein the first area in a first frame of the moving image is visually similar to the second area in a second frame of the moving image; and generating a block of interpolated pixel values from pixel values representing the first area in the first frame and pixel values representing the second area in the second frame, wherein the block of interpolated pixel values represents a third area in an interpolated frame.

Still another embodiment of the invention is a method for generating a two-dimensional array representing an interpolated frame. The method includes: filling a buffer alternatively with a dummy value or with weighted average values from a first and second frames; and generating a block of pixel values for each motion vector, wherein each generated block of pixel values is determined from the pixel values which represent a base area of a corresponding motion vector for the second frame and pixel values which represent an area of the first frame that is offset from the base area by an amount indicated by the motion vector. Each generated block of pixel values is written to the buffer at storage locations which correspond to an area which is offset from the base area by a fraction of the motion vector. The pixel values written replace some or all of the average or dummy values in the third buffer. Any remaining dummy values are replaced with pixel values that are weighted averages of corresponding pixel values from the first and second frames.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an embodiment of the invention, a video decoding and display system uses temporal post-processing to provide smoother motion in moving images. The temporal post-processing uses motion vectors to generate one or more interpolated frames. The post-processing converts motion vectors which indicate visually similar areas in first and second frames to interpolated motion vectors which indicate areas in the interpolated frames which are similar to the areas in the first and second frames.

In one embodiment of the invention, each component of each motion vector is divided by two and used to generate an interpolated frame half way between the first and second frames. An area in the first frame is matched with an area in the interpolated frame half way to the visually similar base area in the second frame. Display times of the first and second frames are delayed so that the display time of the interpolated frame is half way between the display times of the first and second frames.

Figure 1:
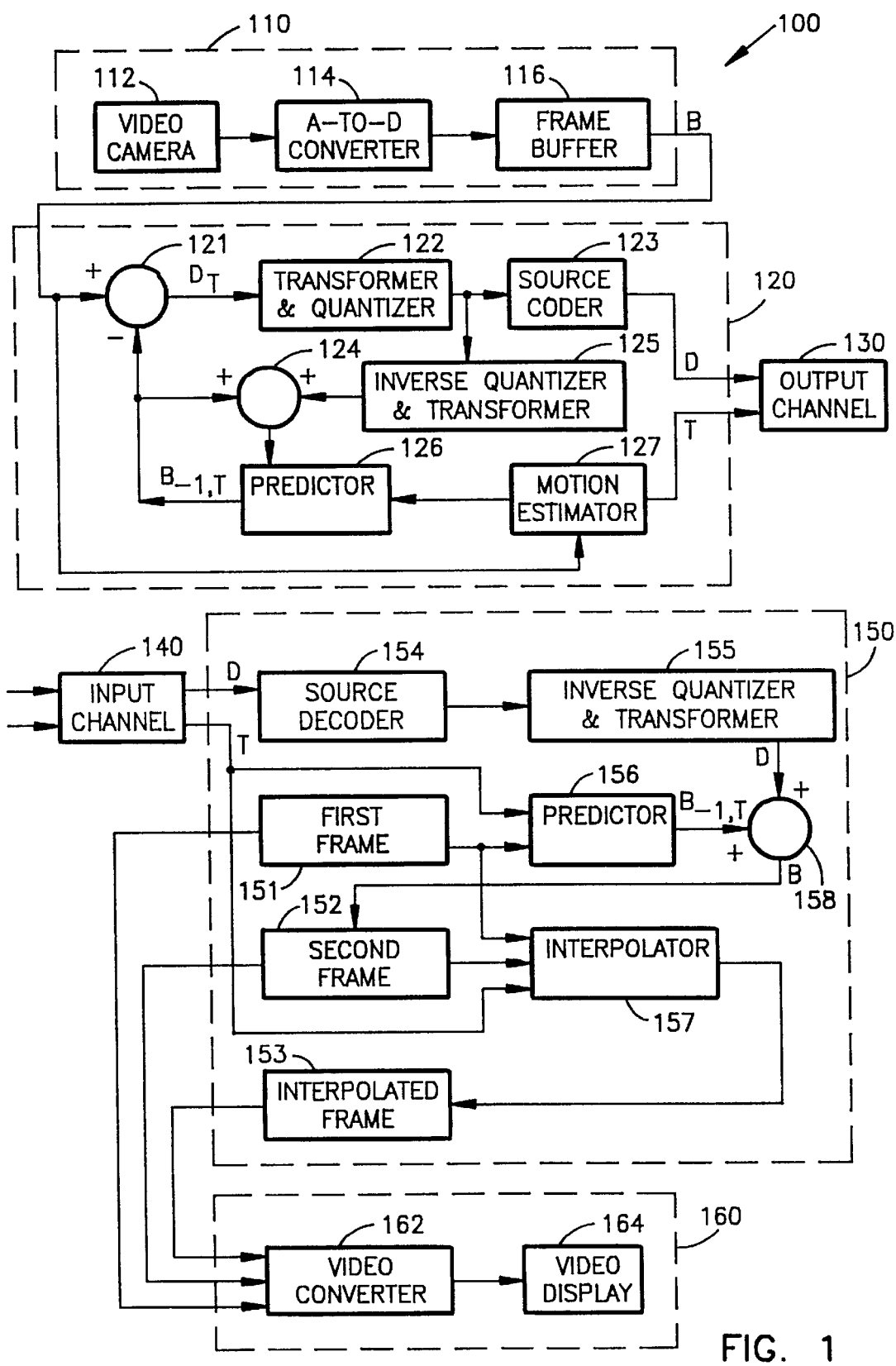
FIG. 1 shows a block diagram of a videophone system in accordance with the invention.

FIG. 1 shows an embodiment of a videophone system 100 in accordance with the invention. Videophone system 100 contains a video source 110, an encoder 120, a decoder 150, and a video display system 160. Video source 110 is a conventional source of a digital representation of a moving image. In the embodiment shown in FIG. 1, video source 110 includes a conventional video camera 112 which generates an analog video signal representing the moving image. An analog-to-digital converter 114 converts the analog signal into a series of two-dimensional arrays of pixel values which are stored in a frame buffer 116. Encoder 120 converts the series of two-dimensional arrays into a code representing the moving image and then transmits the code via an output channel 130 to a decoder, similar to decoder 150, in another videophone system (not shown). Channel 130 may be for example a PSTN phone line carrying an H.26P signal, but any video transmission standard may be employed.

Figure 2:
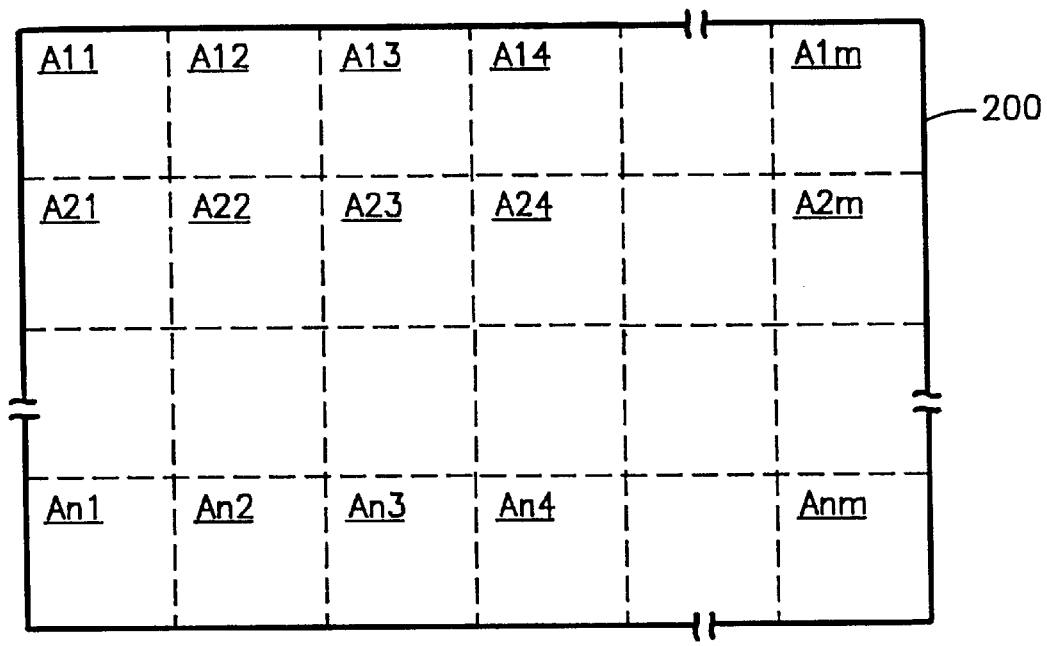
FIG. 2 shows a partition of a moving image into base areas.
Figure 3:
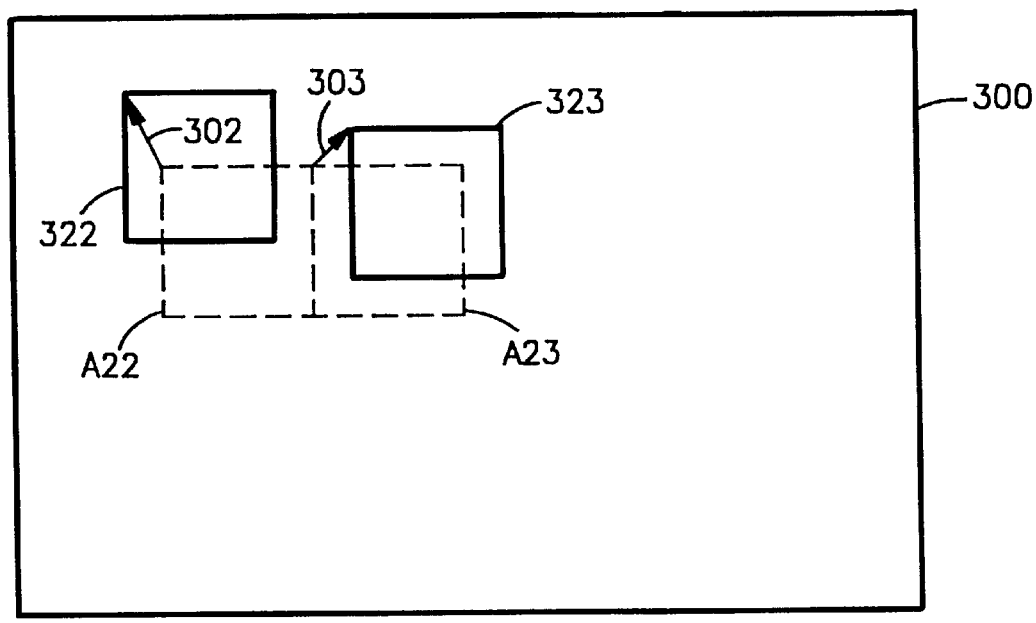
FIG. 3 illustrates how motion vectors match areas in a current frame with similar areas in a previous frame.

FIGS. 2 and 3 illustrate a motion estimation process and are described in conjunction with FIG. 1. For encoding, a two-dimensional array of pixel values is partitioned into blocks B which represent base areas A11 to Anm in a current frame 200. The term base area is used herein to indicate an area which is the base of a motion vector that indicates an offset from the base area. The number of blocks (areas A11 to Anm) depends on the size of the moving image and the size of the blocks. For the H.26P standard, the moving image is 176×144 pixels and the blocks are 16×16 or 8×8 pixel values.

For each base area A11 to Anm, encoder 120 fetches a block B from frame buffer 116 and attempts to find a motion vector T and a difference block D for block B. In a first step of an encoding process, a motion estimator 127 searches the previous frame to find a block $B_{-1,T}$ which is similar block B. (As used herein, the subscript −1 indicates a block is from the previous frame, and the subscript T indicates the block corresponds to an area translated by motion vector T from the base area corresponding to block B.) Search techniques which determine motion vectors are well known in the art. For example, U.S. patent application Ser. No. 08/347,771, entitled "Motion Estimation using a Hierarchial Search" describes some search techniques and is incorporated by reference in its entirety.

In FIG. 3, pixel values of a block corresponding to an area A22 in the current frame are similar to pixel values for an area 322 in previous frame 300. Area 322 is offset from base area A22 by a motion vector 302. Similarly, a block corresponding to an area A23 is similar to a block for area 323 which is offset from base area A23 by motion vector 303.

Whether two blocks are visually similar is determined by calculating a norm of the difference between the blocks, and comparing the calculated norm to a threshold value. Common norms include the sum of the square differences or the absolute differences between corresponding pixel values in the two blocks, but other norms can be used. Blocks are similar if the calculated norm is less than the threshold value. If no similar block is found, block B is referred to as an intra block. Typically, pixel values, instead of difference blocks and motion vectors, are encoded and transmitted for intra blocks.

If a block $B_{-1,T}$ is found that is similar to block B, a predictor 126 supplies pixel values of block $B_{-1,T}$ to an adder 121. Adder 121 subtracts block $B_{-1,T}$ from block B and generates a difference block D which corresponds to block B and motion vector T. A transformer and quantizer 122 performs a conventional transformation such as a discrete cosine transform on difference block D and quantizes the results to provide symbol values representing the transformed difference block. A source coder 123 performs variable length coding, such as Huffman coding or arithmetic coding, on the symbols to reduce the number of bits required to transmit the coefficients of the transformed difference block D.

Inverse quantizer and transformer 125 and adder 124 decode the results from transformer and quantizer 122 to generate a decoded two-dimensional array for later use by predictor 126 and motion estimator 127. Motion estimator 127 transmits the motion vector T that corresponds to difference block D.

Decoder 150 receives motion vectors and coded difference blocks and generates two-dimensional arrays of pixel values which are displayed on a video display 164. For each area A11 to Anm in the current frame (also referred to below as the second frame), a source decoder 154 and an inverse quantizer and transformer 155 in decoder 150 undoes the variable length or arithmetic coding, the quantization, and transformation which were performed to encode difference block D. An adder 158 combines decoded difference block D with block $B_{-1,T}$ which a predictor 156 fetches from a buffer 151 containing a two-dimensional array of pixel values representing the previous frame (also referred to below as the first frame). Buffers 151, 152, and 153 are sets of data storage locations which may be provided in the same memory or in separate memories. To decode the second frame, adder 158 writes block B, which results from the combination of block D and $B_{-1,T}$, to buffer 152.

In accordance with the embodiment of the invention shown in FIG. 1, an interpolator 157 generates one or more interpolated frames from pixel values in buffer 151, pixel values in buffer 152, and the motion vectors for the second frame. This is equivalent to generating interpolated frames from the first frame, the motion vectors, and difference blocks for the second frame because the first frame, the motion vectors, and the difference blocks indicate the content of the second frame.

One process for generating a two-dimensional array representing an interpolated frame first fills buffer 153 with a dummy value such as −1, and then, for each motion vector T (each block B which is not an intra block) of the second frame, generates a block $B_{-x,T(x)}$ in the interpolated frame. Index x is a fraction which depends on the number and spacing of interpolated frames between the first and second frames. For N equally spaced interpolated frames, index x is one of 1/(N+1), 2/(N+1), . . . N/(N+1). Motion vector T(x) is a vector function of x. Block $B_{-x,T(x)}$ corresponds to an area in the interpolated frame and offset by motion vector T(x) from the base area represented by block B.

Pixel values for block $B_{-x,T(x)}$ are determined by a weighted average as in equation (1).

$$B_{-x,T(x)} = \{w(x)*B + [1-w(x)]*B_{-1,T}\} \tag{1}$$

where w(x) is a weighting factor between 0 and 1, B is a block in the second frame having motion vector T, and $B_{-1,T}$ is a block in the first fame offset from block B by motion vector T. In one embodiment, motion vector T(x) is a linear function and equals the product x*T. Using linear interpolation and weighting, equation (1) is replaced with equation (2).

$$B_{-x,x*T} = \{x*B + [1-x]*B_{-1,T}\} \tag{2}$$

In an exemplary process, one interpolated frame is inserted between the first and second frames; index x has value ½; and for each block B of the second frame, a block $B_{-½,½T}$ is generated according to equation (3).

$$B_{-½,½T} = (½*B_{-1,T} + ½*B) \tag{3}$$

The remaining disclosure concentrates on the exemplary embodiment where equation (3) determines pixel values for an interpolated frame between the first and second frames. Generalizations to cases using equations (1) and (2) will be apparent in view of this disclosure.

Figure 4:
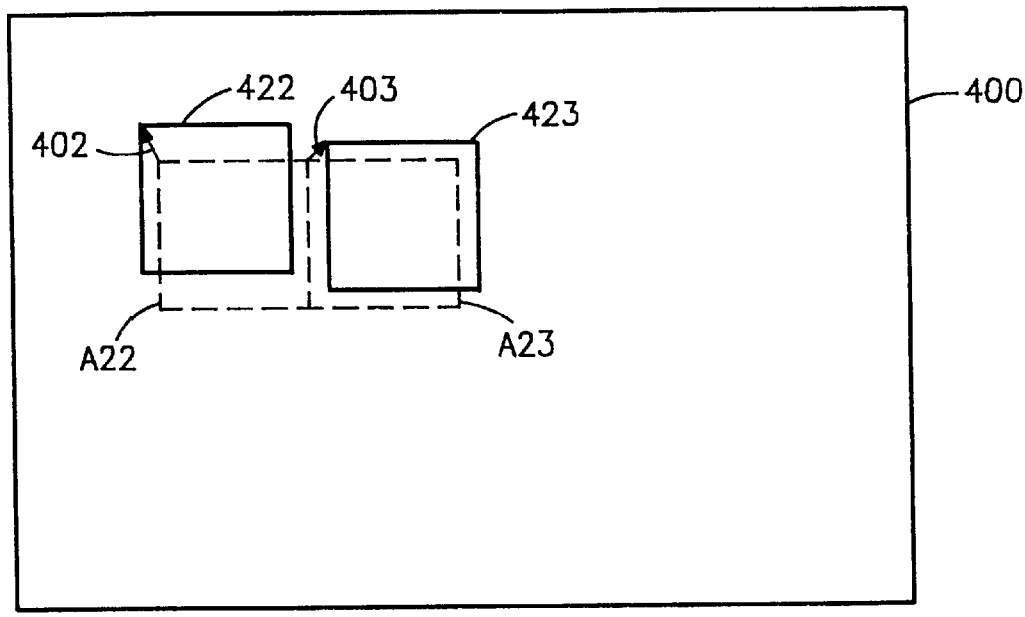
FIG. 4 shows areas in an interpolated frame which match areas in a current frame.

Interpolator 157 writes pixel values generated according to equation (3) in buffer 153 at storage locations which represent the area corresponding to the block $B_{-½,½T}$. As shown in FIG. 4, if block B corresponds to area A22, block $B_{-½,½T}$ corresponds to an area 422 which is displaced from area A22 by a motion vector 402 which is half of motion vector 302. If block B corresponds to area A23, block $B_{-½,½T}$ corresponds to area 423 which is displaced from area A23 by a motion vector 403 which is half of motion vector 303.

Equation (3) is not used on intra blocks which don't have motion vectors. If the second frame contains only a few intra blocks, the intra blocks are ignored and gaps in the two-dimensional array representing the interpolated frame are filled using a fill-in process described below. If the number of intra blocks exceeds a threshold value, the interpolated frame is set equal to the first or second frame.

Writing pixel values to buffer 153 for each interpolated block $B_{-½,½T}$ replaces dummy values which originally filled buffer 153 and previously written pixel values for other interpolated blocks. However, as illustrated by area 422 and 423, some storage locations may still contain dummy values because some areas in the interpolated frame, e.g. the gap between areas 422 and 423 and areas near intra blocks, do not correspond to any block $B_{-½,½T}$. A fill-in process overwrites each storage location containing the dummy value with a pixel value P given by equation (4).

$$P_{-½} = (½P_{-1} + ½*p) \tag{4}$$

where $P_{-1}$ and P are pixel values in the first and second frames, respectively, at relative locations that are the same as the relative location of pixel value $P_{-½}$ in the interpolated frame. In the general or linear cases, a fill-in pixel $P_{-x}$ is given respectively by equation (5) or (6).

$$P_{-x} = \{[1-w(x)]*P_{-1} + w(x)*P\} \tag{5}$$

$$P_{-x} = \{[1-x]*P_{-1} + x*P\} \tag{6}$$

where w(x) is the weighting factor from equation (1).

As an alternative to initially filing buffer 153 with a dummy value and later replacing any remaining dummy values, buffer 153 can be initially filled with average values P or PR as given by equations (4), (5), or (6). Generating interpolated blocks overwrites some or all of the average values and leaves the average values in the gaps between the interpolated blocks.

After generation of one or more two-dimensional arrays of pixel values representing one or more interpolated frames between the first and second frames, one or more interpolated frames between the second frame and a third transmitted frame are generated. The process is further repeated to provide a series of frames including interpolated frames between each pair of successive transmitted frames.

A video converter 162 converts the two-dimensional arrays in buffers 151, 152, and 153 into a video signal for video display 164. The video signal represents the first frame followed by one or more interpolated frames followed by the second frame. For best effect, display of the interpolated frames should be at intervals in proportion with the index x. For example, where one interpolated frame is generated for index x equal to ½, the interpolated frame should be displayed at a time half way between display of the first and second frames. To maintain this timing, display of the first and second frames is delayed.

Figure 5:
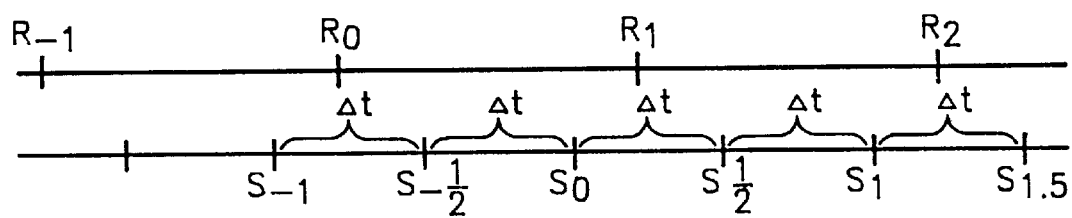
FIG. 5 shows time lines indicating receipt and display times for frames of a moving image.

FIG. 5 shows time lines for the decode and display processes of the exemplary embodiment. At times $R_{-1}$ and $R_0$, decoder 150 receives the last codes representing the first and second frames, respectively. Decoding the second frame and generation of the interpolated frame proceed a block at a time substantially in parallel to minimize delay in displaying the interpolated frame. Display of the interpolated frame begins when the generation process reaches a row of blocks which are more than half the maximum motion vector below the top of the moving image. After this point, rows of pixel at the top of the interpolated frame are not changed by generating interpolated blocks.

First display of the bottom of the interpolated frame, is at time $S_{-½}$, slightly after time $R_0$. Corresponding display times $S_{-1}$ and $S_0$ for the first and second frames are separated from each other by the time between transmitted frames and are delayed relative to decoding to provide an equal time interval Δt before and after display time $S_{-\frac{1}{2}}$ of the interpolated frame. The delay in displaying the second frame creates a time interval Δt before display of the last part of an interpolated frame between the second frame and a third transmitted frame. The pattern shown in FIG. 5 repeats to provide equal time intervals between interpolated and transmitted frames throughout display of the moving image.

Delaying video display can be a problem if the delay causes frames of the moving image to become noticeably out of synchronization with accompanying audio. The amount of delay depends on the frame rate and the time required to generate interpolated frames, but typically, delays for decoding and generating a single interpolated frame shift video display by less than about 200 milliseconds which is tolerable for most applications. However, the audio can also be delayed to keep video and audio in synchronization if desired.

The appendix contains a C source code listing of a procedure interpol_mid_frame which generates an interpolated frame preceding a current frame indicated by an index imv. Before procedure interpol_mid_frame starts, arrays memY_prev_f and memY_curr_f respectively contain pixel values of a previous frame and the current frame. In procedure interpol_mid_frame, a first set of nested loops, fills an array memY_mid_f with an average of the previous and current frame. Values BLK_ROWS and BLK_COLS indicate the number of blocks in a row or column of a frame. A second set of nested loops generates interpolated pixel values using the motion vectors given by an array mvect. As a result of procedure interpol_mid_frame, array memY_mid_f contains pixel values for the interpolated frame.

Although the present invention is described with reference to particular embodiments, the description is only an example of the invention's application and should not be taken as a limitation. In particular, although temporal post-processing is disclosed as applied to a videophone system, embodiments of the invention are not limited to such applications. Any moving image having a low frame rate can benefit the post-processing described. For example, the above disclosed processes can be used for displaying moving images stored at low frame rate on CD-ROM or other storage medium. Further, although processes described are most easily applied to the wide variety of compression techniques which use motion estimation, motion vectors need not be stored or transmitted with the representation of the moving image. Instead, motion vectors can be generated as part of the temporal post-processing. Various other adaptations and combinations of features of the embodiments disclosed will be apparent to those skilled in the art and are within the scope of the present invention as defined by the following claims.

APPENDIX

```
void interpol_mid_frame(int imv)
{ int i,j, m,n;
  int hmvx, hmvy;
  int real_row, real_col;
  int adj_prev_x, adj_prev_y;
  int adj_curr_x, adj_curr_y;
  for(i=0; i<BLK_ROWS; i++)
    for (j=0; j<BLK_COLS; j++)
      for (m=0; m<16; m++)
        for (n=0; n<16; n++)
        { real_row = 16*i + m;
          real_col = 16*j + n;
```

APPENDIX -continued

```
          memY_mid_f[real_row][real_col] =
            (memY_prev_f[real_row][real_col] +
             memY_curr_f[real_row][real_col])/2;
        }
  for(i=0; i<BLK_ROWS; i++)
    for (j=0; j<BLK_COLS; j++)
    { hmvx = (int) (mvect[imv][i][j].x/2);
      hmvy = (int) (mvect[imv][i][j].y/2);
      for (m=0; m<16; m++)
        for (n=0; n<16; n++)
        { real_row = 16*i + m;
          real_col = 16*j + n;
          adj_prev_x = real_col + hmvx;
          adj_prev_y = real_row + hmvy;
          adj_curr_x = real_col + 2*hmvx;
          adj_curr_y = real_row + 2*hmvy;
          memY_mid_f[adj_prev_y][adj_prev_x] =
            (memY_prev_f[adj_curr_y][adj_curr_x] +
             memY_curr_f[real_row][real_col])/2;
        }
    }
}
```

I claim:

1. A process for real-time decoding and displaying a moving image, comprising:

decoding a first frame from a signal representing the moving image;

decoding a second frame from the signal representing the moving image, wherein the second frame immediately follows the first frame in a first series of frames encoded in the signal representing the moving image;

generating an interpolated frame that is not encoded in the signal representing the moving image, wherein generating the interpolated frame comprises:

determining a set of motion vectors that corresponds to a set of base areas in the second frame, each motion vector identifying an area that is in the first frame and is similar to the base area corresponding to the motion vector;

determining interpolated motion vectors from the motion vectors; and for each interpolated motion vector, generating a block of pixel values representing an area of the interpolated frame having a position that the interpolated motion vector identifies; and displaying a second series of frames that includes the first frame followed by the interpolated frame followed by the second frame, whereby displaying the second series of frames provides a higher frame rate than does the signal representing the image.

2. The process of claim 1, wherein decoding the second frame further comprises determining from the signal representing the moving image, the motion vectors from which the interpolated motion vectors are generated.

3. The process of claim 2, wherein decoding the second frame further comprises determining difference blocks from the signal representing the moving image, wherein each difference block represents a difference between a first block in the first frame and a second block in the second frame, and the first block is offset from the second block by an amount indicated by a corresponding one of the motion vectors.

4. The process of claim 3, wherein generating the interpolated frame further comprises determining the blocks of pixel values representing the interpolated frame from pixel values representing the first frame and the difference blocks decoded from the signal representing the moving image.

5. The process of claim 1, wherein generating the interpolated frame further comprises determining the block of pixel values representing the interpolated frame from pixel values representing the first frame and pixel values representing the second frame.

6. The process of claim 1, wherein:
generating the interpolated frame further comprises generating a series of interpolated frames that are not encoded in the signal representing the moving image; and
displaying the second series of frames comprises displaying the first frame followed by the series of interpolated frames followed by the second frame.

7. The process of claim 1, wherein displaying the second series of frames further comprises:
delaying display of the first frame for a first period after decoding the first frame; and
delaying display of the second frame for a second period after decoding the second frame, wherein
the first and second periods have durations selected so that display of the interpolated frame is equally [space] spaced between display of the first frame and display of the second frame.

8. A real-time processing method for display of a moving image, comprising:
decoding a signal to generate a first two-dimensional array of pixel values which represent a first frame of the moving image;
decoding the signal to generate a second two-dimensional array of pixel values representing the second frame of the moving image;
determining motion vectors, wherein each motion vector corresponds to a different base area in the moving image and indicates an offset to an area of the first frame which is similar to the base area of the second frame;
generating a third two-dimensional array of pixel values representing an interpolated frame that is not encoded in the signal, wherein generating the third two-dimensional array comprises:
scaling the motion vectors to generate interpolated motion vectors; and
for each interpolated motion vector, generating a block of pixel values representing an area of the interpolated frame having a position that the interpolated motion vector identifies;
displaying the first frame as represented by the first two-dimensional array;
displaying the interpolated frame as represented by the third two-dimensional array, after displaying the first frame; and
displaying the second frame as represented by the second two-dimensional array, after displaying the interpolated frame.

9. The method of claim 8, wherein generating the third two-dimensional array comprises:
filling a buffer with average pixel values, wherein each average pixel value is an average of a corresponding pixel value in the first array and a corresponding pixel, value in the second array; and
writing each generated block of pixel values to the buffer at storage locations which correspond to an area of the interpolated frame having a position that an interpolated motion vector identifies.

10. A process for real-time decoding and displaying a moving image, comprising:
decoding a first frame from a signal representing the moving image;
decoding a second frame from the signal representing the moving image, the second frame immediately following the first frame in a series of frames encoded in the signal, the second frame including base blocks of pixels, each of the base blocks having a motion vector associated therewith;
determining an interpolated motion vector for each of the motion vectors;
generating an interpolated frame that is not in the series of frames encoded in the signal representing the moving image, wherein generating the interpolated frame comprises generating an interpolated block for each of the base blocks, the interpolated motion vectors indicating positions of the interpolated blocks in the interpolated frame; and
displaying the moving image by:
displaying the first frame;
after displaying the first frame, beginning display of the interpolated frame immediately after the step of generating the interpolated frame has generated all pixels within the interpolated frame that are within a distance of one half of a maximum motion vector magnitude from a display start area; and
displaying the second frame after completing display of the interpolated frame.

11. The process of claim 10, wherein displaying the moving image occurs during decoding of the signal representing the moving image.

12. The process of claim 10, wherein the moving image appears on a display of a video phone.

13. The process of claim 12, wherein displaying the first frame, the interpolated frame, and the second frame, comprise respectively, displaying the first frame on a video phone display, displaying the interpolated frame on the video phone display, and displaying the second frame on the video phone display while the video phone simultaneously receives the signal representing the moving image.

14. The method of claim 10, wherein:
the interpolated blocks collectively fail to cover a portion of the interpolated frame; and
generating the interpolated frame further comprises generating pixel values for the portion of the interpolated frame that none of the interpolated blocks covers.

15. The method of claim 8, wherein generating a third two-dimensional array further comprises for each pixel value in the third array that is not in any of the interpolated blocks of pixel values generated for the interpolated motion vectors, generating a weighted average of a corresponding pixel value in the first array and a corresponding pixel value in the second array.

* * * * *